United States Patent
Chen et al.

(10) Patent No.: US 9,716,982 B2
(45) Date of Patent: Jul. 25, 2017

(54) APPARATUS AND METHOD FOR PROVIDING INTERACTIVE SERVICES IN A NETWORK

(75) Inventors: Kun Chen, Shanghai (CN); Jie Ling, Shanghai (CN); Jinyang Xie, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 101 days.

(21) Appl. No.: 14/417,663

(22) PCT Filed: Jul. 27, 2012

(86) PCT No.: PCT/CN2012/079258
§ 371 (c)(1),
(2), (4) Date: Jan. 27, 2015

(87) PCT Pub. No.: WO2014/015512
PCT Pub. Date: Jan. 30, 2014

(65) Prior Publication Data
US 2015/0256981 A1    Sep. 10, 2015

(51) Int. Cl.
| | |
|---|---|
| *H04N 21/85* | (2011.01) |
| *H04W 4/06* | (2009.01) |
| *H04L 29/06* | (2006.01) |
| *H04N 21/8543* | (2011.01) |
| *H04L 29/08* | (2006.01) |

(52) U.S. Cl.
CPC .......... *H04W 4/06* (2013.01); *H04L 65/4084* (2013.01); *H04L 67/06* (2013.01); *H04N 21/8543* (2013.01)

(58) Field of Classification Search
None
See application file for complete search history.

(56) References Cited

U.S. PATENT DOCUMENTS

| | | | |
|---|---|---|---|
| 8,763,036 | B2 | 6/2014 | Seppälä et al. |
| 2007/0110057 | A1 | 5/2007 | Hwang |

(Continued)

FOREIGN PATENT DOCUMENTS

| | | |
|---|---|---|
| CN | 101300832 A | 11/2008 |
| CN | 101305532 A | 11/2008 |

(Continued)

OTHER PUBLICATIONS

Service Guide for Mobile Broadcast Services, Jul. 9, 2012.*

(Continued)

*Primary Examiner* — Cai Chen
(74) *Attorney, Agent, or Firm* — Rothwell, Figg, Ernst & Manbeck, P.C.

(57) ABSTRACT

A method in a user equipment node for providing interactive services to a user of the user equipment node, comprising the steps of receiving an interactivity media file comprising information which is to be presented to the user. An interactivity description fragment is also received, the interactivity description fragment comprising one or more command signals for controlling how the information received in the interactivity media file is to be presented to the user. The information received in the interactivity media file is presented to the user using the one or more command signals received in the interactivity description fragment.

14 Claims, 6 Drawing Sheets

(56) References Cited

U.S. PATENT DOCUMENTS

2011/0106963 A1     5/2011   Lee et al.
2012/0288031 A1*   11/2012   Vare .................. H04N 21/4345
                                                                                     375/316

FOREIGN PATENT DOCUMENTS

| CN | 101547052 A | 9/2009 |
|----|-------------|--------|
| CN | 101572796 A | 11/2009 |
| CN | 101656755 A | 2/2010 |
| EP | 2076032 A2 | 7/2009 |

OTHER PUBLICATIONS

Extended European Search Report dated Jan. 25, 2016, issued in European Patent Application No. 12881847.3, 7 pages.
"Service Guide for Mobile Broadcast Services; OMA-TS-BCAST_Service_Guide-V1_2_20120709-D" No. 1.2, 2012, 299 pages.
3GPP, 3rd Generation Partnership Project; Universal Mobile Telecommunications System (UMTS); LTE; Transparent end-to-end Packet-switched Streaming Service (PSS); Protocols and codecs (3GPP TS 26.234 version 11.4.0 Release 11), ETSI TS 126 234, V.11.4.0, Jul. 2014, 178 pages.
OMA, Open Mobile Alliance, Service Guide for Mobile Broadcast Services, Draft Version 1.1—Dec. 5, 2011, 302 pages.
Office Action dated May 3, 2017, issued in Chinese Patent Application No. 201280076119.6, 10 pages.
OMA, CPEL1550092P, "Service Guide for Mobile Broadcast Services" Candidate Version 1.1—Sep. 14, 2010, Open Mobile Alliance, OMA-TS-BCAST_Service_Guide-V1_1-20100914-C, 10 pages.

* cited by examiner

```
<?xml version="1.0" encoding="UTF-8"?>
<xs:schema xmlns="urn:3GPP:metadata:2012:MBMS:userServiceDescription"
 xmlns:xs="http://www.w3.org/2001/XMLSchema"
 targetNamespace="urn:3GPP:metadata:2012:MBMS:userServiceDescription"
 elementFormDefault="qualified">

<xs:element name="interactivity" type="interactivityDescriptionType" minOccurs="0"
maxOccurs="unbounded"/>
 <xs:complexType name="interactivityDescriptionType">
  <xs:attribute name="interactivityDescriptionURI" type="xs:anyURI"
use="required"/>
 </xs:complexType>

</xs:schema>
```

Figure 3

```xml
<?xml version="1.0" encoding="UTF-8"?>
<xs:schema xmlns="urn:3gpp:metadata:2012:MBMS:interactivityDescription"
xmlns:xs="http://www.w3.org/2001/XMLSchema"
targetNamespace="urn:3gpp:metadata:2012:MBMS:interactivityDescription"
elementFormDefault="qualified">
    <xs:complexType name="interactivityDescriptionType">
        <xs:sequence>
            <xs:element name="interactivityMediaURI" type="xs:anyURI"/>
            <xs:element name="interactivityType" type="xs:string" minOccurs="0"/>
            <xs:element name="presentationWindow" maxOccurs="unbounded">
                <xs:complexType>
                    <xs:choice>
                        <xs:element name="absolutePresentationWindow">
                            <xs:complexType>
                                <xs:choice>
                                    <xs:element name="oneTimeAbsolutePresentationWindow">
                                        <xs:complexType>
                                            <xs:sequence>
                                                <xs:element name="start" type="xs:dateTime"/>
                                                <xs:element name="interactivityPeriod" type="xs:unsignedInt"/>
                                            </xs:sequence>
                                        </xs:complexType>
                                    </xs:element>
                                    <xs:element name="recurrentAbsolutePresentationWindow">
                                        <xs:complexType>
                                            <xs:sequence>
                                                <xs:element name="start" type="xs:dateTime"/>
                                                <xs:element name="stop" type="xs:dateTime"/>
                                                <xs:element name="repetitionTimes" type="xs:unsignedInt"/>
                                                <xs:element name="repeatPeriod" type="xs:unsignedInt"/>
                                                <xs:element name="interactivityPeriod" type="xs:unsignedInt"/>
                                            </xs:sequence>
                                        </xs:complexType>
                                    </xs:element>
                                </xs:choice>
                            </xs:complexType>
                        </xs:element>
                        <xs:element name="relativePresentationWindow">
                            <xs:complexType>
                                <xs:sequence>
                                    <xs:element name="contentURI" type="xs:anyURI"/>
                                    <xs:element name="relativeStartTime" type="xs:unsignedInt" maxOccurs="unbounded"/>
                                    <xs:element name="interactivityPeriod" type="xs:unsignedInt"/>
                                </xs:sequence>
                            </xs:complexType>
                        </xs:element>
                    </xs:choice>
                </xs:complexType>
            </xs:element>
        </xs:sequence>
    </xs:complexType>
    <xs:element name="interactivityDescription" type="interactivityDescriptionType"/>
</xs:schema>
```

APPARATUS AND METHOD FOR PROVIDING INTERACTIVE SERVICES IN A NETWORK

CROSS REFERENCE TO RELATED APPLICATION(S)

This application is a 35 U.S.C. §371 National Phase Entry Application from PCT/CN2012/079258, filed Jul. 27, 2012, designating the United States, the disclosure of which is incorporated herein in its entirety by reference.

TECHNICAL FIELD

The present invention relates to an apparatus and method for providing interactive services in a network, and in particular to a user equipment node and a network node, and methods performed in a user equipment node and a network node for providing such interactive services, for example which enable enhanced interactive services to be provided over services such as an Evolved Multimedia Broadcast/Multicast Service, eMBMS, to enrich user experience.

BACKGROUND

Multimedia Broadcast/Multicast Service (MBMS) is a point-to-multipoint service in which data is transmitted from a single source entity to multiple recipients. Transmitting the same data to multiple recipients allows network resources to be shared.

Evolved Multimedia Broadcast/Multicast Service (eMBMS) is a broadcasting service offered via Evolved Packet Systems, including the evolved UMTS Terrestrial Radio Access Network (E-UTRAN) of the $3^{rd}$ Generation Partnership Project's (3GPP's) Long Term Evolution (LTE) architecture.

A typical application for eMBMS is to deliver video content relating to a sporting game or event to a large number of mobile phones owned by users gathered in a stadium. An eMBMS system can use a MBMS streaming delivery method or MBMS download delivery method to deliver live television content to such terminals. The MBMS streaming delivery method relates to delivering continuous multimedia data over MBMS bearers, while the MBMS download delivery method uses the FLUTE (File Delivery over Unidirectional Transport) protocol when delivering content over MBMS bearers. Applying HTTP Live Streaming (HLS) or Dynamic Adaptive Streaming over HTTP (DASH), media segments can be delivered as files over a MBMS download to offer the most popular and demanding service, Live TV.

Another typical application is the distribution of popular updates, such as an Android™ update for example, to many users. An eMBMS system can use the MBMS download delivery method (UDP/FLUTE) as the protocol to deliver popular files such as an Android™ update, or indeed other files such as a YouTube™ clip preloading, or major news events.

Figure 1:
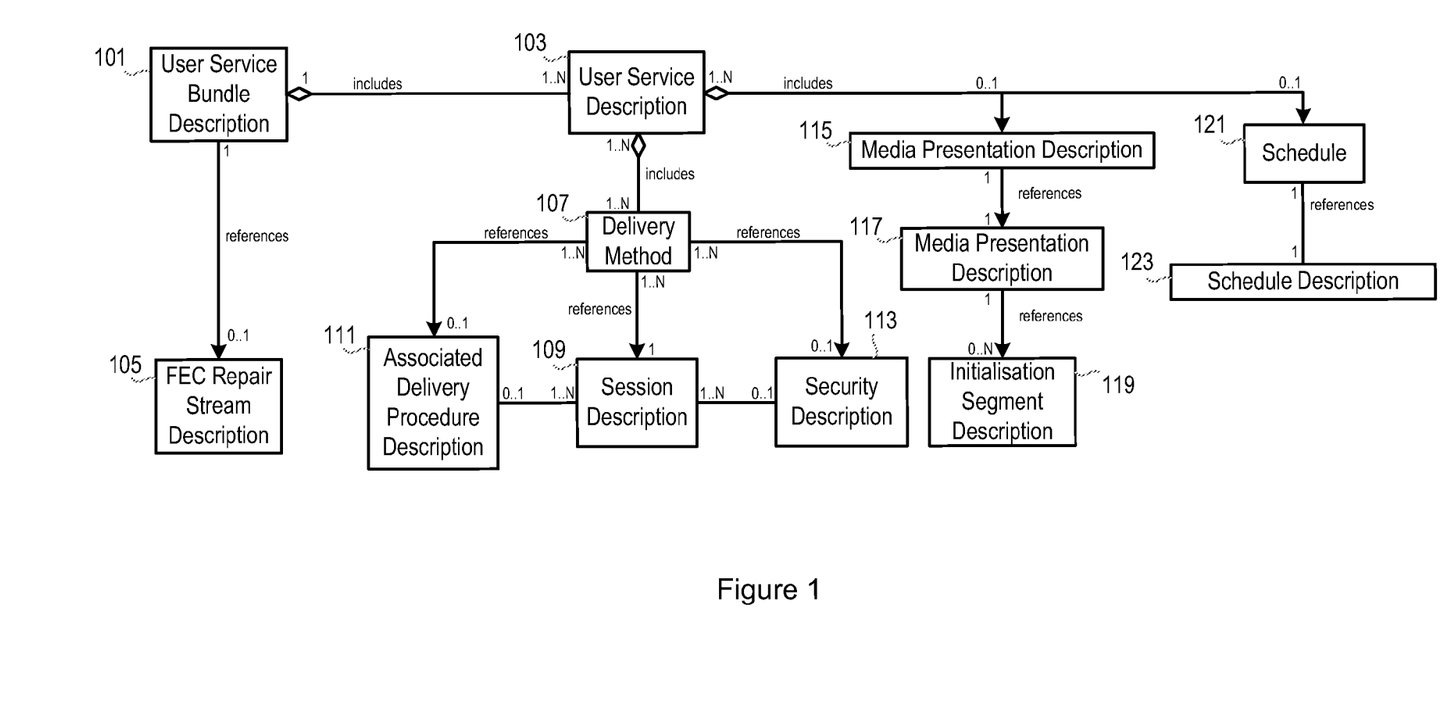
FIG. 1 shows a data model of user services in eMBMS according to the technical specification relating to the $3^{rd}$ Generation Partnership Project Technical Specification 3GPP TS 26.346.

In eMBMS, the user services are described in a data model as shown in FIG. 1, which is defined in the technical specification relating to 3GPP TS 26.346. FIG. 1 illustrates a simple data model relation between description instances using a Unified Modelling Language (UML) for a single User Service Bundle Description 101, where "N" indicates that there can be any number in each instance.

This data model comprises fragments of metadata which are delivered to many user equipments in a suitable manner. A metadata fragment can be considered as a single uniquely identifiable block of metadata.

The User Service Bundle Description fragment 101 relates to the one-to-group user services. It may contain one or more User Service Description (USD) instances 103. It may also refer to a single FEC Repair Stream Description 105. The User Service Description instance 103 contains one or more Delivery Method description 107, which is used to describe how the service is delivered to a user equipment (UE) node. The Delivery Method description 107 refers to a Session Description instance 109, which describes the delivery related parameters. An Associated Delivery Procedure Description 111 may also be referenced by a Delivery Method description 107 to provide the complementary delivery method for the service (for example file repair in eMBMS). The Delivery Method description 107 may also reference a Security Description 113 to provide service protection information.

In the event that Dynamic Adaptive Streaming over HTTP (DASH) formatted contents are to be delivered in eMBMS, the User Service Description fragment 103 will contain a Media Presentation Description instance 115. The Media Presentation Description instance 115 will reference to a Media Presentation Description (MPD) fragment 117, which also may refer to one or more Initialisation Segment Description (ISD) fragments 119.

The User Service Description instance 103 may also include one Schedule instance 121, which refers to one Schedule Description fragment 123, which describes the scheduled delivery periods.

Interactivity is one of the most attractive features in Mobile TV services. Typical applications are interactivity messages, commercials, advertisements, text tickers, voting, chat, and so on. For example, during a live TV show that is being watched by many users, a dialog can be popped up towards end users, asking the users to vote for a winner. Another typical example can be in relation to a user watching a video clip, whereby a rolling text is presented from time to time, to provide advertisement information towards the end users. In such examples the dialog or the rolling text itself can be considered as interactivity media.

The interactivity media therefore contains the interactivity information which is to be presented towards end users by their respective UEs. The interactivity media can take several forms, for example a JPEG image to be displayed as an advertisement banner, or an HTML/XHTML page to be displayed as a text ticker for news or weather information. As another example the interactivity media could be a SVG dialog requesting an end user to vote. Depending on the capability of the UEs being used by end users, the format of the interactivity media can vary.

A disadvantage of existing systems is that, while it is possible for a UE to receive interactivity media from a broadcasting bearer, as well as the linear TV channel or video clip, a UE is not able to perform any other functions, for example associating the interactivity media with any specific linear TV channel or a video clip. A UE is also not aware of when the interactivity media should be presented towards end users. It is therefore difficult for a UE to offer an interactivity function for a Mobile TV service, unless it implements some proprietary extension together with a Mobile TV server, which is not included in eMBMS standards defined by 3GPP.

SUMMARY

It is an aim of the present invention to provide a method and apparatus which obviate or reduce at least one or more of the disadvantages mentioned above.

According to a first aspect of the invention, there is provided a method in a user equipment node for providing interactive services to a user of the user equipment node. The method comprises the steps of receiving an interactivity media file comprising information which is to be presented to the user, and receiving an interactivity description fragment, the interactivity description fragment comprising one or more command signals for controlling how the information received in the interactivity media file is to be presented to the user. The information received in the interactivity media file is presented to the user using the one or more command signals received in the interactivity description fragment.

According to a second aspect of the invention, there is provided a method in a broadcast-multicast service centre node of a network for providing interactive services to a plurality of user equipment nodes. The method comprises the steps of transmitting an interactivity media file comprising information which is to be presented to one or more user, and transmitting an associated interactivity description fragment, the interactivity description fragment comprising one or more command signals for controlling how the information being transmitted in the associated interactivity media file is to be presented to the one or more users.

According to another aspect of the invention, there is provided a user equipment node for providing interactive services to a user of the user equipment node. The user equipment node comprises a receiving unit configured to receive an interactivity media file comprising information which is to be presented to the user. The receiving unit is further configured to receive an interactivity description fragment, the interactivity description fragment comprising one or more command signals for controlling how the information received in the interactivity media file is to be presented to the user. A presenting unit is adapted to present the information received in the interactivity media file to the user using the one or more command signals received in the interactivity description fragment.

According to another aspect of the invention, there is provided a broadcast-multicast service centre node of a network for providing interactive services to a plurality of user equipment nodes. The broadcast-multicast service centre node comprises a transmitting unit configured to transmit an interactivity media file comprising information which is to be presented to a user. The transmitting unit is further configured to transmit an associated interactivity description fragment, the interactivity description fragment comprising one or more command signals for controlling how the information being transmitted in the associated interactivity media file is to be presented to the one or more users.

According to another aspect of the invention, there is provided a data model for technical specification 3GPP TS 26.346, wherein the data model is adapted to provide an interactivity description fragment in association with an interactivity element relating to a user service description element.

BRIEF DESCRIPTION OF THE DRAWINGS

For a better understanding of the present invention, and to show more clearly how it may be carried into effect, reference will now be made, by way of example only, to the following drawings in which:

FIG. 4 shows an example of a schema showing how an Interactivity Description fragment can be provided;

DETAILED DESCRIPTION

The embodiments of the invention are based on providing more than interactivity media alone, in order to offer enhanced interactivity services in applications such as Mobile TV. It is noted that, although some of the embodiments below will be described in relation to Mobile TV, the invention is not limited to this application, and is intended to embrace any application that can be used with the apparatus and methods as defined in the appended claims.

To achieve better effectiveness for Interactivity Media, the embodiments of the present invention provide an "interactivity description fragment" which allows the presentation of the Interactivity Media by a user equipment node to a user to be enhanced.

As will be described in greater detail below, this may be achieved by extending the existing data model according to the technical specification relating to the $3^{rd}$ Generation Partnership Project Technical Specification 3GPP TS 26.346.

The interactivity media can be made content sensitive, for example, using the interactivity description fragment. For example, advertisements relating to new technology gadgets might fit well during TV programmes whose target audience are youth. In another words, the interactivity media can be associated with a specific linear TV program or a specific video clip, using the interactivity description fragment.

The interactivity media can also be made time sensitive. For example, during a TV show having a live competition, the interactivity description fragment can ensure that voting for the best performer is presented after all of the candidates have demonstrated their talents.

To present the interactivity media towards end users, a user equipment node needs to know the target TV channel or video clip. The user equipment node also needs to be aware of when the interactivity media should be presented towards end users. According to embodiments of the invention, as described below, the Interactivity Description fragment contains such associated information of the Interactivity Media.

Figure 2:
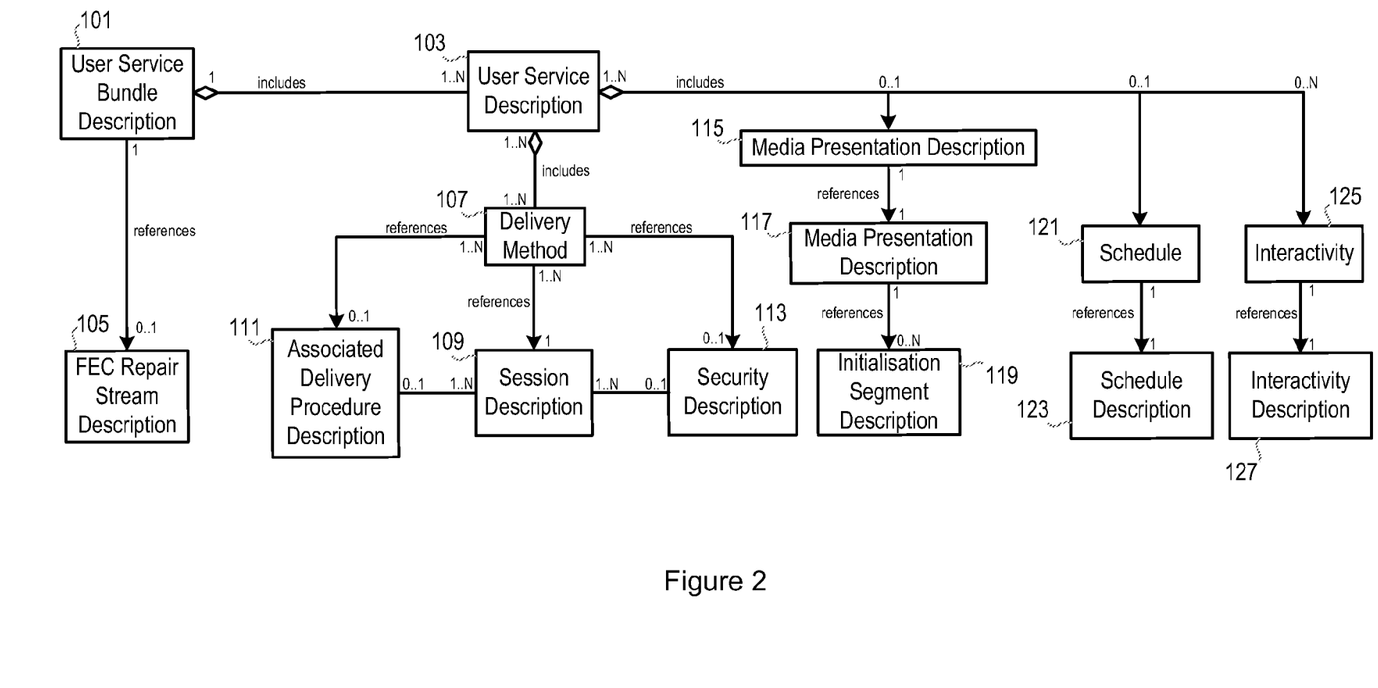
FIG. 2 shows a data model according to an embodiment of the present invention.

FIG. 2 shows an example of how the 3GPP user service data model according to 3GPP TS 26.346 may be adapted according to an embodiment of the invention.

As described above in relation to FIG. 1, in FIG. 2 the User Service Bundle Description fragment 101 relates to the one-to-group user services. It may contain one or more User Service Description (USD) instances 103. It may also refer to a FEC Repair Stream Description 105.

The User Service Description instance 103 contains one or more Delivery Method description 107, which is used to describe how the service is delivered to a user equipment (UE) node. The Delivery Method description 107 refers to a Session Description instance 109, which describes the delivery related parameters. An Associated Delivery Procedure Description 111 may also be referenced by a Delivery Method description 107 to provide the complementary delivery method for the service (for example file repair in eMBMS). The Delivery Method description 107 may also reference a Security Description 113 to provide the service protection information.

In the event that Dynamic Adaptive Streaming over HTTP (DASH) formatted contents are to be delivered in eMBMS, for example, the User Service Description fragment 103 will contain a Media Presentation Description instance 115. The Media Presentation Description instance 115 references a Media Presentation Description (MPD) fragment 117, which also may refer to one or more Initialisation Segment Description (ISD) fragments 119.

The User Service Description instance 103 may also include a Schedule instance 121, which refers to a Schedule Description fragment 123, which describes the scheduled delivery periods.

According to embodiments of the invention, the data model is enhanced such that the User Service Description 103 may include one or more Interactivity Elements 125. An Interactivity Element 125 can be provided as an optional feature in the User Service Description 103. Each Interactivity Element 125 can reference an Interactivity Description fragment 127, for example using a URI that points to the Interactivity Description fragment 127.

Figure 3:
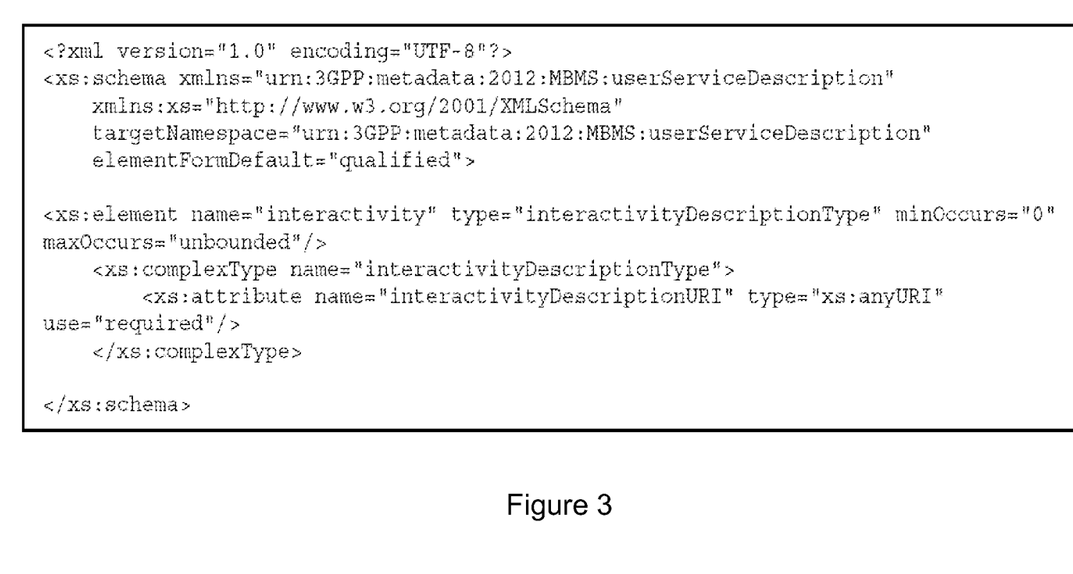
FIG. 3 shows an example of a schema relating to an extension to the User Service Description of the Technical Specification 3GPP TS 26.346, to include the Interactivity Element.

The schema shown in FIG. 3 shows an example of an extension to the User Service Description 103, to include the Interactivity Element 125.

The schema shown in FIG. 4 shows an example of how the Interactivity Description fragment 127 can be introduced.

It will be appreciated that the schema shown in FIGS. 3 and 4 are examples only, and that other schema may be provided for achieving the same end result.

Figure 5:
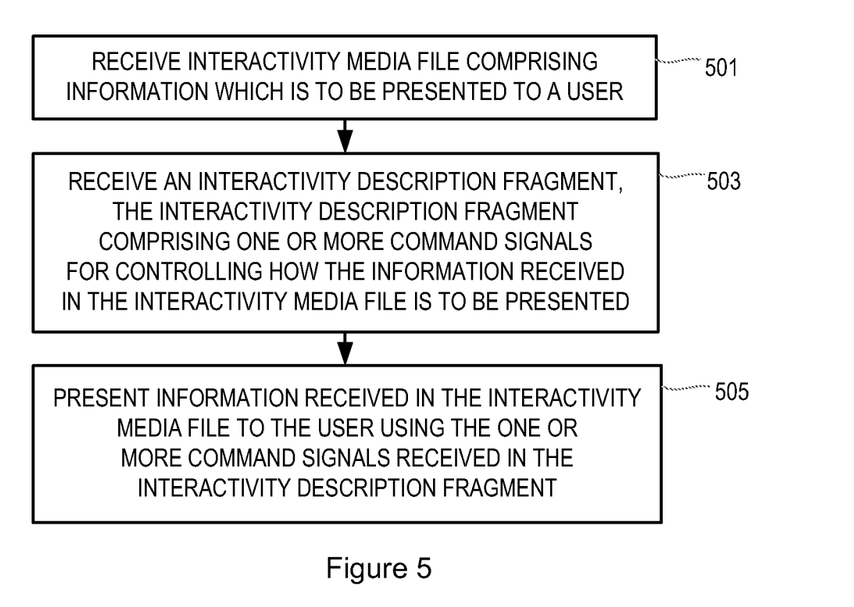
FIG. 5 shows the method performed in a user equipment node according to an embodiment of the invention.

FIG. 5 shows a method performed in a user equipment node for providing interactive services to a user of the user equipment node, according to an embodiment of the invention. The method comprises the step of receiving an interactivity media file comprising information which is to be presented to the user, step 501. This information may comprise, for example, an advertisement, a text ticker, a voting request, chat, and so on. It is noted that the information is not limited to these examples, and may include other types of information depending on the application being used. It is also noted that the information may include visual and/or audio information.

In step 503 the user equipment node receives an interactivity description fragment, the interactivity description fragment comprising one or more command signals for controlling how the information received in the interactivity media file is to be presented to the user. For example, as will be described below the interactivity description fragment may include one or more command signals relating to how and/or when the interactivity media file is to be presented to a user.

It is noted that the interactivity media file and the interactivity description fragment can be received in any order. For example, the interactivity description fragment may be received prior to receiving the interactivity media file, for example during a User Service Description (USD) announcement.

The information received in the interactivity media file is presented to the user, step 505, using the one or more command signals received in the interactivity description fragment.

The interactivity description fragment may comprise a first command signal relating to an address of the interactivity media file. This enables the user equipment node to reference the interactivity media file using the first command signal. For example, the first command signal can comprise an URI address of the interactivity media, and may be identified as an "interactivityMediaUR1" field of the interactivity description fragment, which can be globally unique. Thus, it can be seen that, using the first command signal, an instance of an interactivity description fragment can be identified using a URI. This has the advantage of enabling user equipment nodes to cross-reference in-band and out-of-band interactivity description fragments.

The interactivity description fragment may comprise a second command signal relating to the format or interactivity type of interactivity media file. This enables the user equipment node to present the interactivity media file using the format or type of media indicated by the second command signal. For example, the second command signal may be used to identify the interactivity type of the interactivity media file as being an advertisement banner, a news feed, an information ticker, a voting request, and so on. The second command signal may be identified as an "interactivityType" field in the interactivity description fragment.

The interactivity description fragment may comprise a third command signal for providing time related information. This enables the user equipment node to present the information received with the interactivity media file using the third command signal, thereby controlling the timing of the presentation of the interactivity media file. The third command signal may be identified as a "presentationWindow" field in the interactivity description fragment. The third command signal can be configured to provide an absolute time window or a relative time window for presenting the interactivity media file to a user.

If the third command signal provides an absolute time window, this can be either a one-time absolute time window or a recurrent absolute time window. As such, the user equipment node can be configured to present the information received in the interactivity media file in a one-time absolute time window, or present the information received in the interactivity media file in a recurrent absolute time window, based on the third command signal.

For a one-time absolute time window, the user equipment node can be configured to present the interactivity media at a start time, and continue to present the interactivity media for a predetermined period of time, for example defined by an interactivityPeriod field.

For a recurrent absolute time window, the user equipment node can be configured to present the interactivity media recurrently. The user equipment node is configured to present the interactivity media at a start time, and continue to present the interactivity media for a predetermined period, for example defined by an "interactivityPeriod" field. Then, after a set period has passed, for example defined in a "repeatPeriod" field, the user equipment node is configured to present the interactivity media again. The total number of repeat presentations can be set to any value, for example using a "repetitionTimes" field. After the interactivity media has been presented a set amount of repeat times, the user equipment node is configured to stop presenting that particular interactivity media to its end user.

If the third command signal is configured to provide a relative time window, the user equipment is configured to present the interactivity media during a period when specific content is being played, for example as identified in a "contentURl" field. A start time, for example defined by a "relativeStartTime" field, defines when the interactivity media should be presented towards end users. It is calculated based on the start of content. The presentation period can be defined using the interactivityPeriod field described above, but triggered by the specific content (as identified using the relativeStartTime field), rather than a specific time. If a recurrent presentation is required, multiple relativeStart-Time elements can be defined.

Therefore, when providing a relative time window, the information received in the interactivity media file is presented during one or more time periods triggered by specific content in the information being presented.

It is noted that an interactivity description fragment may contain any one or more of the command signals described herein, in any combination thereof.

According to one embodiment the interactivity description fragment may be delivered to a user equipment node via a service discovery channel, SDCH, during a User Service Discovery/Announcement period. SDCH is a broadcast channel which is dedicated for User Service Discovery/Announcement over a MBMS bearer. A MBMS User Service Discovery refers to methods for enabling a user equipment node to obtain a list of available MBMS user services along with information on the user service, while User Service Announcement refers to methods for the MBMS service provider to make the list of available MBMS user services along with information on the user service available to the user equipment node.

According to another embodiment, the interactivity description fragment may be delivered in-band within the download delivery session which is used to transport a content media file, i.e. the media content.

According to another embodiment, the interactivity description fragment may be delivered via a dedicated data channel that is provided to transport the interactivity information.

According to another embodiment, the interactivity description fragment may be delivered via HTTP and other interactive transport methods.

According to another embodiment, the interactivity description fragment may be delivered via a point-to-point push bearer. The point-to-point push bearer may be a SMS bearer, or a HTTP push bearer.

It is thereffore noted that the interactivity description fragement can be delivered in-band or out-of-band.

As such, in FIG. 5, the step of receiving an interactivity description fragment in a user equipment node can comprise the step of receiving the interactivity description fragment by:
  extracting the interactivity description fragment from a service discovery channel, SDCH, during a user service discovery announcement period; or
  extracting the interactivity description fragment from an in-band signal within a download delivery session being used to transport the content media file; or
  extracting the interactivity description fragment from a dedicated data channel provided to transport interactivity information; or
  extracting the interactivity description fragment from HTTP and other interactive transport methods; or
  extracting the interactivity description fragment from a point-to-point push bearer.

It is noted, however, that other methods of transporting the interactivity description fragment are intended to be embraced by the present invention.

The MIME type of each metadata fragment needs to be known to a user equipment node. The MIME type for the interactivity description fragment can be defined as "application/mbms-interactivity+xml", for example. It denotes that the message body is an interactivity description instance in accordance with the XML schema "urn:3GPP:metadata:2012:MBMS:interactivityDescription", as shown in FIG. 4 above. According to another example, a MBMS Metadata envelope used in the existing standard can also be applied for the reception of the interactivity description fragment.

The availability of an interactivity description fragment is indicated by the presence of the Interactivity element 125 in the MBMS User Service Description 103, as shown in FIG. 2 above. The actual URI to the interactivity description fragment can be provided, for example in the form of an interactivityDescriptionURl field in the Interactivity element 125. eMBMS provides two methods, for example, to deliver content to a user equipment node: a streaming delivery method and a download delivery method. Linear TV channels and video clips can be delivered to a user equipment node either via the streaming delivery method or via the download delivery method (for example using HTTP Streaming). According to one embodiment, the interactivity media file can be delivered to a user equipment node via the download delivery method as one or more file objects. It is noted that MBMS download delivery methods are for discrete objects (e.g. files), while MBMS streaming delivery method is for continuous media, according to 3GPP. The interactive media files can be discrete objects according to one embodiment, such that the download delivery method can be used for their transport.

An interactivity media file contains the interactivity information which is to be presented towards end users by a user equipment node. For example, the interactivity media file can be one uncompressed media file (e.g. JPEG picture for advertisements, SVG dialog for voting) or one GZIP archive file containing one or more compressed media objects (for example a GZIP file containing HTML/XHTML page, related cascading style sheets, and the pictures included in the HTML/XHTML page). It is noted that other formats for an interactivity media file are intended to be embraced by embodiments of the present invention The interactivity media file is referenced by the interactivity description fragment.

The methods described above for delivering the interactivity description fragment can also be used for the delivery of the interactivity media file.

That is, according to one embodiment the interactivity media file is delivered via the service discovery channel (SDCH) during a User Service Discovery/Announcement period.

According to another embodiment, the interactivity media file is delivered in-band within the download delivery session which is used to transport the media content.

According to another embodiment the interactivity media file is delivered via a dedicated data channel that is provided to transport interactivity information.

According to another embodiment, the interactivity media is delivered via HTTP and other interactive transport methods.

According to another embodiment, the interactivity media is delivered via a point-to-point push bearer. The point-to-point push bearer may be a SMS bearer, or a HTTP push bearer.

It will be appreciated from the above that a user equipment node receives the interactivity description fragment and interactivity media file, and based on the information included in the interactivity description fragment, the user equipment node presents the information contained in the interactivity media file towards end users.

Figure 6:
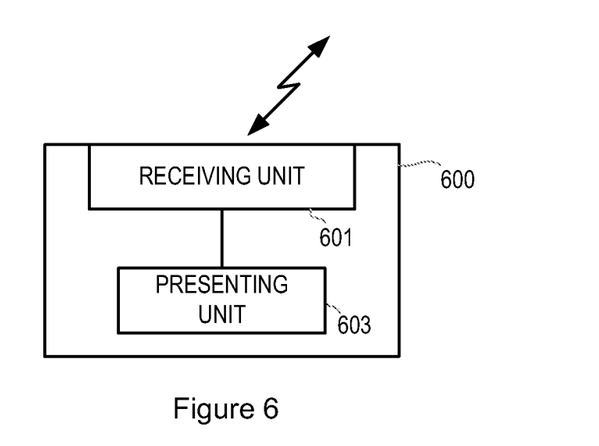
FIG. 6 shows an example of a user equipment node according to an embodiment of the invention.

FIG. 6 shows a user equipment node 600 for providing interactive services to a user of the user equipment node. The user equipment node 600 comprises a receiving unit 601 configured to receive an interactivity media file comprising information which is to be presented to the user. The receiving unit 601 is further configured to receive an interactivity description fragment, the interactivity description fragment comprising one or more command signals for controlling how the information received in the interactivity media file is to be presented to the user. A presenting unit 603 is adapted to present the information received in the interactivity media file to the user using the one or more command signals received in the interactivity description fragment.

The interactivity description fragment may comprise a first command signal relating to an address of the interactivity media file, wherein the user equipment node 600 further comprises a referencing unit (not shown) adapted to reference the interactivity media file using the first command signal.

The interactivity description fragment may comprise a second command signal relating to the interactivity type of interactivity media file, wherein the presenting unit 603 is adapted to present the interactivity media file using the second command signal.

The interactivity description fragment may comprise a third command signal for providing time related information, wherein the presenting unit 603 is adapted to present the information received with the interactivity media file using the third command signal.

The third command signal can provide an absolute time window for controlling when the information received in the interactivity media file is presented to the user. In such an embodiment the presenting unit 603 is adapted to present the information received in the interactivity media file in a one-time absolute time window, or present the information received in the interactivity media file in a recurrent absolute time window, based on the third command signal.

The third command signal can provide a relative time window for controlling when the information received in the interactivity media file is presented to the user, In such an embodiment, the presenting unit is adapted to present the information received in the interactivity media file during one or more time periods triggered by specific content in the information being presented.

The user equipment node can be adapted to receive the interactivity description fragment and/or the interactivity media file in various ways. For example, the receiving unit 601 can be adapted to receive the interactivity description fragment and/or the interactivity media file from a service discovery channel, SDCH, during a user service discovery announcement period; or receive the interactivity description fragment and/or the interactivity media file from an in-band signal within a download delivery session being used to transport the content media file; or receive the interactivity description fragment and/or the interactivity media file from a dedicated data channel provided to transport interactivity information; or receive the interactivity description fragment and/or the interactivity media file from HTTP and other interactive transport methods; or receive the interactivity description fragment and/or the interactive media file from a point-to-point push bearer.

Figure 7:
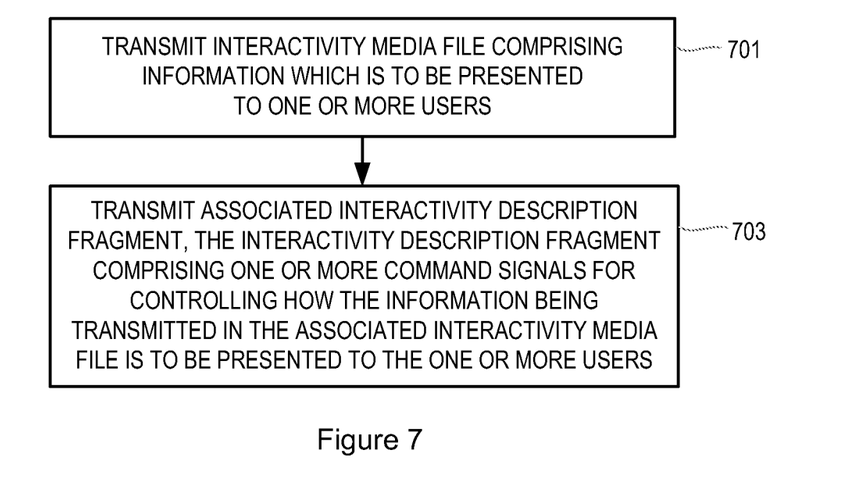
FIG. 7 shows the method performed in a broadcast-multicast service centre node (BM-SC) according to an embodiment of the invention.

FIG. 7 shows a method in a broadcast-multicast service centre node of a network for providing interactive services to a plurality of user equipment nodes, according to an embodiment of the invention. The method comprises the step of transmitting an interactivity media file comprising information which is to be presented to one or more user, step 701. An associated interactivity description fragment is also transmitted, step 703, the interactivity description fragment comprising one or more command signals for controlling how the information being transmitted in the associated interactivity media file is to be presented to the one or more users.

Figure 8:
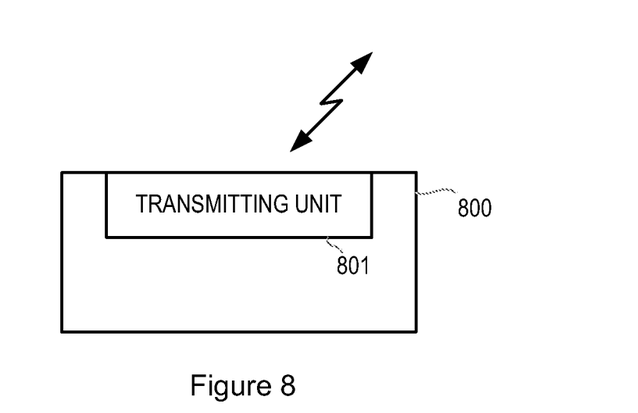
FIG. 8 shows an example of a broadcast-multicast service centre node (BM-SC) according to an embodiment of the invention.

FIG. 8 shows a broadcast-multicast service centre node 800 of a network for providing interactive services to a plurality of user equipment nodes, according to an embodiment of the invention. The broadcast-multicast service centre node 800 comprises a transmitting unit 801 configured to transmit an interactivity media file comprising information which is to be presented to a user. The transmitting unit 801 is further configured to transmit an associated interactivity description fragment, the interactivity description fragment comprising one or more command signals for controlling how the information being transmitted in the associated interactivity media file is to be presented to the one or more users.

The embodiments of the invention described above have the advantage of enabling enhanced interactivity processes to be provided over eMBMS, to enrich user experience of applications such as Mobile TV service.

The embodiments of the invention make it possible to associate the interactivity descriptions fragments with specific linear TV channels or video clips, such that interactivity functions can be targeted more accurately.

The embodiments of the invention also make it possible to define the presentation window of the interactivity descriptions fragments to enhance the effectiveness of the interactivity services presented towards end users.

To enable interactivity in eMBMS, an embodiment of the present invention provides an interactivity description fragment that can be developed to be referenced towards User Service Description of 3 GPP TS 26.346. In other words, an interactivity description fragment is introduced as a complementary fragment towards User Service Description to provide interactivity related information.

It is noted that one or more of the first, second and third command signals mentioned above can be combined in any combination within a particular embodiment.

It is also noted that the presentation of information can include the presentation of visual and/or audio information.

It is noted that, during a service announcement phase, the interactivity media file and/or the interactivity description fragment can be delivered over SDCH (service discovery channel). It is noted that they can also be delivered out of band (e.g. over HTTP via unicast bearer, or OMA push).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several

The invention claimed is:

1. A method in a user equipment node for providing interactive services to a user of the user equipment node, the method comprising the steps of:
receiving an interactivity media file comprising information which is to be presented to the user;
receiving an interactivity description fragment, the interactivity description fragment comprising one or more command signals for controlling how the information received in the interactivity media file is to be presented to the user,
wherein the interactivity description fragment further comprises a first command signal relating to an address of the interactivity media file, and
wherein the interactivity description fragment comprises a second command signal for providing time related information, the second command signal provides a relative time window for controlling when the information received in the interactivity media file is presented to the user;
referencing the interactivity media file using the first command signal; and
presenting the information received in the interactivity media file to the user using the one or more command signals received in the interactivity description fragment,
wherein specific content in the information received in the interactivity media file triggers the relative time window for when the information received in the interactivity media file is presented to the user, and
wherein the relative time window is calculated based on a start time of the specific content.

2. The method as claimed in claim 1, wherein the interactivity description fragment comprises a third command signal relating to the interactivity type of the interactivity media file, and wherein the method comprises the step of presenting the interactivity media file using the second command signal.

3. The method as claimed in claim 1, wherein the second command signal provides an absolute time window for controlling when the information received in the interactivity media file is presented to the user, and wherein the method comprises, based on the third command signal:
present the information received in the interactivity media file in a one-time absolute time window; or
present the information received in the interactivity media file in a recurrent absolute time window.

4. The method as claimed in claim 1, wherein the step of receiving the interactivity description fragment comprises extracting the interactivity description fragment from a service discovery channel (SDCH) during a user service discovery announcement period.

5. A user equipment node for providing interactive services to a user of the user equipment node, the user equipment node comprising:
a receiving unit configured to receive an interactivity media file comprising information which is to be presented to the user;
wherein the receiving unit is further configured to receive an interactivity description fragment, the interactivity description fragment comprising one or more command signals for controlling how the information received in the interactivity media file is to be presented to the user,
wherein the interactivity description fragment further comprises a first command signal relating to an address of the interactivity media file, and
wherein the interactivity description fragment comprises a second command signal for providing time related information, the second command signal provides a relative time window for controlling when the information received in the interactivity media file is presented to the user;
a referencing unit adapted to reference the interactivity media file using the first command signal; and
a presenting unit adapted to present the information received in the interactivity media file to the user using the one or more command signals received in the interactivity description fragment,
wherein specific content in the information received in the interactivity media file triggers the relative time window for when the information received in the interactivity media file is presented to the user, and
wherein the relative time window is calculated based on a start time of the specific content.

6. The user equipment node as claimed in claim 5, wherein the interactivity description fragment comprises a third command signal relating to the interactivity type of the interactivity media file, and wherein the presenting unit is adapted to present the interactivity media file using the second command signal.

7. The user equipment node as claimed in claim 5, wherein the second command signal provides an absolute time window for controlling when the information received in the interactivity media file is presented to the user, and wherein the presenting unit is adapted to:
present the information received in the interactivity media file in a one-time absolute time window; or
present the information received in the interactivity media file in a recurrent absolute time window, based on the third command signal.

8. The user equipment node as claimed in claim 5, wherein the receiving unit is adapted to:
receive the interactivity description fragment from one of:
(1) a service discovery channel (SDCH) during a user service discovery announcement period;
(2) an in-band signal within a download delivery session being used to transport content media files;
(3) a dedicated data channel provided to transport interactivity information;
(4) a HyperText Transfer Protocol message; and
(5) a point-to-point push bearer.

9. A method in a broadcast-multicast service centre node of a network for providing interactive services to a plurality of user equipment nodes, the method comprising the steps of:
transmitting an interactivity media file comprising information which is to be presented to one or more users; and
transmitting an associated interactivity description fragment, the interactivity description fragment comprising one or more command signals for controlling how the information being transmitted in the associated interactivity media file is to be presented to the one or more users,
wherein the interactivity description fragment further comprises a first command signal relating to an address of the interactivity media file,
the first command signal is configured to be used to reference the interactivity media file, wherein the interactivity description fragment comprises a second command signal for providing time related information, the second command signal provides a relative time window for controlling when the information received in the interactivity media file is presented to the user, wherein specific content in the information in the interactivity media file triggers the relative time window for when the information in the interactivity media file is presented to the user, and wherein the relative time window is calculated based on a start time of the specific content.

10. A broadcast-multicast service centre node of a network for providing interactive services to a plurality of user equipment nodes, the broadcast-multicast service centre node comprising:
   a transmitting unit configured to transmit an interactivity media file comprising information which is to be presented to one or more users;
      wherein the transmitting unit is further configured to transmit an associated interactivity description fragment, the interactivity description fragment comprising one or more command signals for controlling how the information being transmitted in the associated interactivity media file is to be presented to the one or more users,
   wherein the interactivity description fragment further comprises a first command signal relating to an address of the interactivity media file,
   the first command signal is configured to be used to reference the interactivity media file,
   wherein the interactivity description fragment comprises a second command signal for providing time related information, the second command signal provides a relative time window for controlling when the information received in the interactivity media file is presented to the user,
   wherein specific content in the information in the interactivity media file triggers the relative time window for when the information in the interactivity media file is presented to the user, and
   wherein the relative time window is calculated based on a start time of the specific content.

11. The method as claimed in claim 1, wherein the interactivity description fragment is associated with an interactivity element relating to a user service description element according to technical specification 3GPP TS 26.346.

12. The method as claimed in claim 1, wherein the step of receiving the interactivity description fragment comprises extracting the interactivity description fragment from one of:
   (1) an in-band signal within a download delivery session being used to transport content media files;
   (2) a dedicated data channel provided to transport interactivity information;
   (3) a HyperText Transfer Protocol message; and
   (4) a point-to-point push bearer.

13. The method as claimed in claim 1, wherein the step of receiving the interactivity media file comprises extracting the interactivity media file from one of:
   (1) a service discovery channel (SDCH) during a user service discovery announcement period;
   (2) an in-band signal within a download delivery session being used to transport content media files; and
   (3) a dedicated data channel provided to transport interactivity information.

14. The user equipment node as claimed in claim 5, wherein the receiving unit is adapted to:
   receive the interactivity media file from one of:
      (1) a service discovery channel (SDCH) during a user service discovery announcement period;
      (2) an in-band signal within a download delivery session being used to transport content media files; and
      (3) a dedicated data channel provided to transport interactivity information.

* * * * *